Patented Apr. 23, 1946

2,398,778

UNITED STATES PATENT OFFICE 2,398,778

SENSITIZED PHOTOGRAPHIC EMULSION

Burt H. Carroll and John Spence, Rochester, N. Y., assignors to Eastman Kodak Company, Rochester, N. Y., a corporation of New Jersey No Drawing. Application November 24, 1942, Serial No. 466,796

19 Claims. (Cl. 95—7)

This invention relates to sensitized photographic emulsion and more particularly to spectrally (optically) sensitized emulsions.

It is known that the distribution of spectral sensitivity of certain spectrally sensitized emulsions can be altered and an increase of sensitivity obtained in some spectral region, by incorporating certain additional sensitizing dyes in the spectrally sensitized emulsions. (See United States Patents 2,158,882, dated May 16, 1939, and 2,159,565, dated May 23, 1939.) The effect thus obtained has come to be known as supersensitization. Supersensitization of certain spectrally sensitized emulsions can also be effected by incorporating certain substantially colorless heterocyclic bases, viz. those containing an amino group, in the spectrally sensitized emulsions. (See United States Patent 2,177,635, dated October 31, 1939.) Supersensitization differs from hypersensitization which involves treatment of finished films or plates, an operation which normally reduces the pAg and increases the pH of the emulsions, with consequent decreased stability.

We have now found a new method for supersensitizing spectrally sensitized emulsions, which not only does not reduce the stability of the emulsions, but is especially valuable as a means of giving panchromatic sensitized emulsions of high speed and exceptionally good color balance.

It is, accordingly, an object of our invention to provide new supersensitized photographic emulsions. A further object is to provide a process for preparing such emulsions. Still other objects will become apparent hereinafter.

In accordance with the invention, a photographic silver halide emulsion other than a chloride emulsion, e. g. silver chlorobromide, silver bromide or silver bromiodide emulsions, spectrally sensitized with a cyanine dye is supersensitized by incorporating in the emulsion certain heterocyclic nitrogen bases. Our invention is directed principally to emulsions of such grain size that the emulsions give a substantially neutral-toned image in Eastman Kodak Company's "D-76" developer, and should not be confused with prior proposals to obtain blue-black tones in fine-grain emulsions by means of heterocyclic nitrogen bases. Moreover, our invention involves incorporation of the heterocyclic bases in the emulsion before exposure of the emulsion and should not be confused with proposals to develop with color-forming developers silver-salt images, in the presence of certain heterocyclic nitrogen bases which contain a reactive methyl groups.

The heterocyclic nitrogen bases employed are of a specific type and can be defined as those having but one nitrogen atom in the heterocyclic ring, the nitrogen atom being doubly bound to a carbon atom of the heterocyclic ring, the heterocyclic ring containing a fused-on carbocyclic ri the heterocyclic bases being selected from t! containing in addition to nitrogen a hetero atom other than nitrogen in the heterocyclic ring and no substituents other than the fused-on carbocyclic ring and no substituents on the carbocyclic ring, those containing in addition to nitrogen a hetero atom other than nitrogen in the heterocyclic ring and containing on the heterocyclic ring or the carbocyclic ring a substituent selected from the group consisting of alkyl groups, hydroxyalkyl groups, alkoxy groups, aryl groups, aryloxy groups, alkylmercapto groups, arylmercapto groups, acyloxy groups and halogen atoms, those containing no hetero atom other than the nitrogen in the heterocyclic ring and containing on the heterocyclic ring or the carbocyclic ring a substituent selected from the group consisting of alkyl groups, hydroxylalkyl, alkoxy groups, aryl groups, aryloxy groups, alkylmercapto groups, arylmercapto groups and halogen atoms. Exemplary of these heterocyclic bases are the following:

2-methylquinoline (quinaldine)
4-methylquinoline (lepidine)
6-methylquinoline
7-methylquinoline
8-methylquinoline
6-ethylquinoline
2,4,8-trimethylquinoline
6-methoxyquinoline
8-ethoxyquinoline
8-ethoxy-2,4-dimethylquinoline
5-chloroquinoline
7-chloroquinoline
2,4-dichloroquinoline
2-chloro-7-methylquinoline
2-chloro-8-methylquinoline
2-(γ,γ,γ-trichloropropenyl)-quinoline
2-(β-hydroxyethyl)-7-methylquinoline
2-phenylmercaptoquinoline
1,2-dimethylbenzo[f]quinoline (2,4 - dimethyl-β-naphthoquinoline)
3-chlorobenzo[f]quinoline
2-ethylbenzoxazole
3-methylbenzisoxazole
benzothiazole
2-methylbenzothiazole
2-acetoxybenzothiazole
2-methoxybenzothiazole
2-methyl-4-ethoxybenzothiazole
2,4-dimethylbenzothiazole
2,4,6-trimethylbenzothiazole
2-chlorobenzothiazole
2-(β-phenylethyl)-benzothiazole
5-chloro-2-methylbenzothiazole
2-methylbenzoselenazole
2-methyl-β-naphthothiazole
2-ethyl-β-naphthothiazole
2,3,3-trimethyl indolenine Some of the substituted quinoline bases are especially effective supersensitizers.

The majority of cyanine dyes which are supersensitized by the heterocyclic bases are characterized by the fact that the dyes produce two types of sensitization depending upon conditions. Such different types of sensitization are described by Leermakers, Carroll and Staud, J. Chem. Physics, 5, 878 (1937) and by G. Schwarz, Sci. et Ind. Phot. 10, 233 (1939). When a cyanine dye of this type is used as a sensitizer in low concentration, it exhibits a sensitizing maximum displaced about 20 to 50 mu. toward the red from the absorption maximum in ethyl alcohol solution. On increasing the concentration of the dye, or upon digesting the emulsion containing the dye in the lower concentration, or both, a second maximum of sensitization develops at longer wavelengths, which may be accompanied by an increase in total optical sensitization. In some cases a decrease in sensitivity at the first maximum can be detected. These phenomena are consistent with the hypothesis of two states of the sensitizing dye in an equilibrium which is controlled by concentration. The heterocyclic bases favor the formation of a second maximum which occasionally is appreciably displaced from the normal second maximum. The increase in sensitivity apparently corresponds to increased conversion of the dye to the state corresponding to the second maximum of sensitization. In some cases the effect appears to correspond to a more complete conversion than has ever been obtained without a supersensitizer, and in any case the long wavelength sensitivity is better than can be obtained from the same concentration of dye without the heterocyclic base.

The following are exemplary of the cyanine dyes which can be supersensitized in accordance with our invention:

3,1'-diethyl-6'-methoxy-2'-cyanine iodide
3,3'-diethyl-9-methylthiacarbocyanine bromide
9-ethyl-3,3'-dimethylthiacarbocyanine bromide
5'-chloro-3,3',9-triethylthiacarbocyanine iodide
5,5' - dichloro-3,3',9-triethylthiacarbocyanine iodide
3,3' - diethyl-9-methyl-4,5,4',5' - dibenzthiacarbocyanine bromide
3,3' - diethyl - 9 - methylselenathiacarbocyanine bromide
5'-chloro-3,3'-diethyl - 9 - methylselenathiacarbocyanine iodide
3,3'-diethyl-9-methylselenacarbocyanine bromide The sensitizing dyes can be employed in any desired concentration. Ordinarily from 10 to 30 mg. of dye per liter of emulsion will suffice to produce the optimum sensitizing effect. The methods of incorporating sensitizing dyes in emulsions are well known to those skilled in the art. Ordinarily it is preferable to dissolve the dye in a water-miscible solvent, such as methanol, before incorporating in the emulsion. Ethyl alcohol or acetone may be used where the solubility of the dye in methanol is very low. One or more sensitizing dyes may be employed.

The amount of heterocyclic base employed is not critical. Usually the full supersensitizing effect is developed at a concentration of from 0.10 to 0.50 gram per liter of emulsion. Usually the benzothiazole bases need be employed in concentrations of only 0.05 to 0.25 gram per liter of emulsion. Practically none of the heterocyclic bases has an appreciable effect on the pH of the emulsion. The heterocyclic bases can be added to the emulsion with, before or after the sensitizing dye or dyes. More than one heterocyclic base may be employed. The heterocyclic bases are preferably, but not necessarily diluted with a water-miscible solvent, such as methanol, before incorporation in the emulsion. The sensitizing dye or dyes and the heterocyclic nitrogen base or bases can be added to the emulsion at any convenient stage of its preparation, but preferably to the washed, finished emulsion.

The following examples will serve to illustrate results obtained in accordance with our invention:

Example 1

A fast negative gelatino-silver-bromiodide developing-out emulsion was sensitized with 3,3'-diethyl-9-methyl selenacarbocyanine bromide (20 mg. per liter of emulsion) and to the spectrally sensitized emulsion was added quinaldine. A portion of spectrally sensitized emulsion was exposed with, and another portion without, the addition of the quinaldine, through red (Wratten 25) and minus blue (Wratten 12) filters, the latter giving a good measure of total optical sensitivity.

| Quinaldine (cc. per liter of emulsion) | Red | | Minus blue | | Fog |
|---|---|---|---|---|---|
| | Speed | Gamma | Speed | Gamma | |
| None | 76 | 1.85 | 490 | 1.65 | 0.05 |
| 1.25 | 240 | 1.57 | 500 | 1.73 | .06 |

Example 2

Another fast negative gelatino-silver-bromiodide developing-out emulsion was sensitized with 3,3' - diethyl-9-methyl selenacarbocyanine bromide (20 mg. per liter of emulsion) and to separate batches of the spectrally sensitized emulsion were added various heterocyclic bases. A portion of spectrally sensitized emulsion was exposed with, and another portion without, the addition of the heterocyclic base, through red (Wratten 25) and minus blue (Wratten 12) filters, the latter giving a good measure of total spectral (optical) sensitivity.

| Heterocyclic base (cc./liter of emulsion) | Red | | Minus blue | | Fog |
|---|---|---|---|---|---|
| | Speed | Gamma | Speed | Gamma | |
| None | 63 | 1.62 | 275 | 2.04 | 0.07 |
| Benzothiazole, 0.5 | 135 | 1.86 | 490 | 1.79 | .06 |
| 2-chlorobenzothiazole, 0.5 | 165 | 1.66 | 415 | 1.77 | .06 |
| 2-(β-phenylethyl)-benzothiazole, 0.5 | 105 | 1.02 | 330 | 1.66 | .05 |

Example 3

A fast negative gelatino-silver-bromiodide developing-out emulsion was sensitized with 3,3'-diethyl-9-methylselenacarbocyanine bromide (20 mg. per liter of emulsion) and to the spectrally sensitized emulsion was added 2-ethylbenzoxazole. A portion of spectrally sensitized emulsion was exposed with, and another portion without, the addition of 2-ethylbenzoxazole, through red (Wratten 25) and minus blue (Wratten 12) filters, the latter giving a good measure of total optical (spectral) sensitivity.

| 2-ethylbenzoxazole (cc./liter of emulsion) | Red | | Minus blue | | Fog |
|---|---|---|---|---|---|
| | Speed | Gamma | Speed | Gamma | |
| None | 130 | 1.39 | 725 | 1.40 | 0.05 |
| 1.25 | 240 | 1.36 | 645 | 1.42 | .04 |

Example 4

A fast gelatino-silver-bromiodide developing-out emulsion was sensitized with 9-ethyl-3,3'-dimethyl - 4,5,4',5'-dibenzocarbocyanine bromide (15 mg. per liter of emulsion) and to the spectrally sensitized emulsion was added 2-methyl-β-naphthothiazole. A portion of spectrally sensitized emulsion was exposed with, and another portion without the addition of the 2-methyl-β-naphthothiazole, through red (Wratten 25) and minus blue (Wratten 12) filters, the latter giving a good measure of total optical (spectral) sensitivity.

| 2-methyl-β-naphtho-thiazole (mg./liter of emulsion) | Red | | Minus blue | | Fog |
|---|---|---|---|---|---|
| | Speed | Gamma | Speed | Gamma | |
| None | 102 | 1.35 | 380 | 1.46 | 0.10 |
| 2 | 176 | 1.11 | 330 | 2.32 | .09 |

Some of the heterocyclic bases, while effecting an increase of sensitivity (speed) in some spectral region, cause a decrease in others, and must be employed with this fact in mind. In the above examples, the minus blue speed demonstrates whether or not there is a loss of total spectral sensitivity owing to a decrease of speed in some spectral region. Some of the heterocyclic bases while effecting supersensitization also cause appreciable desensitization in the blue. 2,3,3-trimethylindolenine and 6-isopropyl quinoline are examples of such bases.

Our invention is primarily directed to the customarily employed gelatino-silver-halide developing-out emulsions, such as gelatino-silver-chlorobromide, gelatino-silver-bromide and gelatino - silver - bromiodide developing-out emulsions, especially emulsions for development to black-and-white images by means of non-color-forming developers, e. g. hydroquinone-N-methyl-p-aminophenol developers.

Emulsions prepared in accordance with our invention can be coated in the usual manner upon any desired support, such as cellulose nitrate support, cellulose acetate support, polyvinyl acetal resin support, metal support, glass support or paper support.

The heterocyclic nitrogen bases referred to herein are named and numbered in accordance with the current recommendations of Chemical Abstracts.

What we claim as our invention and desire to be secured by Letters Patent of the United States is:

1. A photographic silver halide emulsion selected from the group consisting of silver chlorobromide, silver bromide and silver bromiodide emulsions spectrally sensitized with a sensitizing cyanine dye containing, as a supersensitizer, a heterocyclic nitrogen base having but one nitrogen atom in the heterocyclic ring, the nitrogen atom being doubly bound to a carbon atom of the heterocyclic ring, the heterocyclic ring containing a fused-on carbocyclic ring, the heterocyclic base being selected from those containing in addition to nitrogen a hetero atom other than nitrogen in the heterocyclic ring and no substituents other than the fused-on carbocyclic ring and no substituents on the carbocyclic ring, those containing in addition to nitrogen a hetero atom other than nitrogen in the heterocyclic ring and containing a substituent but no substituent other than a substituent selected from the group consisting of alkyl groups, hydroxyalkyl groups, alkoxy groups, aryl groups, aryloxy groups, alkylmercapto groups, arylmercapto groups, acyloxy groups and halogen atoms, and those containing no hetero atom other than the nitrogen in the heterocyclic ring and containing a substituent but no substituent other than a substituent selected from the group consisting of alkyl groups, hydroxyalkyl groups, alkoxy groups, aryl groups, aryloxy groups, alkylmercapto groups, arylmercapto groups and halogen atoms.

2. A photographic silver halide developing-out emulsion selected from the group consisting of silver chlorobromide, silver bromide and silver bromiodide emulsions spectrally sensitized with a sensitizing cyanine dye containing, as a supersensitizer, a heterocyclic nitrogen base having but one nitrogen atom in the heterocyclic ring, the nitrogen atom being doubly bound to a carbon atom of the heterocyclic ring, the heterocyclic ring containing a fused-on carbocyclic ring, the heterocyclic base being selected from those containing in addition to nitrogen a hetero atom other than nitrogen in the heterocyclic ring and no substituents on the carbocyclic ring, those containing in addition to nitrogen a hetero atom other than nitrogen in the heterocyclic ring and containing a substituent but no substituent other than a substituent selected from the group consisting of alkyl groups, hydroxyalkyl groups, alkoxy groups, aryl groups, aryloxy groups, alkylmercapto groups, arylmercapto groups, acyloxy groups and halogen atoms, and those containing no hetero atom other than the nitrogen in the heterocyclic ring and containing a substituent but no substituent other than a substituent selected from the group consisting of alkyl groups, hydroxyalkyl groups, alkoxy groups, aryl groups, aryloxy groups, alkylmercapto groups, arylmercapto groups and halogen atoms.

3. A photographic gelatino-silver-halide emulsion selected from the group consisting of gelatino-silver-chlorobromide, gelatino - silver - bromide and gelatino-silver-bromiodide emulsions, spectrally sensitized with a sensitizing cyanine dye containing, as a supersensitizer, a heterocyclic nitrogen base having but one nitrogen atom in the heterocyclic ring, the nitrogen atom being doubly bound to a carbon atom of the heterocyclic ring, the heterocyclic ring containing a fused-on carbocyclic ring, the heterocyclic base being selected from those containing in addition to nitrogen a hetero atom other than nitrogen in the heterocyclic ring and no substituents other than the fused-on carbocyclic ring and no substituents on the carbocyclic ring, those containing in addition to nitrogen a hetero atom other than nitrogen in the heterocyclic ring and containing a substituent but no substituent other than a substituent selected from the group consisting of alkyl groups, hydroxyalkyl groups, alkoxy groups, aryl groups, aryloxy groups, alkylmercapto groups, arylmercapto groups, acyloxy groups and halogen atoms, and those containing no hetero atom other than the nitrogen in the heterocyclic ring and containing a substituent but no substituent other than a substituent selected from the group consisting of alkyl groups, hydroxyalkyl groups, alkoxy groups, aryl groups, aryloxy groups, alkylmercapto groups, arylmercapto groups and halogen atoms.

4. A photographic gelatino-silver-halide developing-out emulsion selected from the group consisting of gelatino-silver-chlorobromide, gelatino-silver-bromide and gelatino-silver-bromiodide developing-out emulsions spectrally sensitized with a sensitizing cyanine dye containing, as a supersensitier, a heterocyclic nitrogen base having but one nitrogen atom in the heterocyclic ring, the nitrogen atom being doubly bound to a carbon atom of the heterocyclic ring, the heterocyclic ring containing a fused-on carbocyclic ring, the heterocyclic base being selected from those containing in addition to nitrogen a hetero atom other than nitrogen in the heterocyclic ring and no substituents other than the used-on carbocyclic ring and no substituents on the carbocyclic ring, those containing in addition to nitrogen a hetero atom other than nitrogen in the heterocyclic ring and containing a substituent but no substitute other than a substituent selected from the group consisting of alkyl groups, hydroxyalkyl groups, alkoxy groups, aryl groups, aryloxy groups, alkylmercapto groups, arylmercapto groups, acyloxy groups and halogen atoms, and those containing no hetero atom other than the nitrogen in the heterocyclic ring and containing a substituent but no substituent other than a substituent selected from the group consisting of alkyl groups, hydroxyalkyl groups, alkoxy groups, aryl groups, aryloxy groups, alkylmercapto groups, arylmercapto groups and halogen atoms.

5. A photographic gelatino-silver-halide developing-out emulsion selected from the group consisting of gelatino-silver-chlorobromide, gelatino-silver-bromide and gelatino-silver-bromiodide developing-out emulsions spectrally sensitized with a cyanine dye which produces a maximum of spectral sensitivity in the emulsion at one concentration and at a higher concentration, or upon digestion of the emulsion containing the dye at the lower concentration, producing a second maximum of spectral sensitivity at a wavelength longer than that of the first maximum, said emulsion containing, as a supersensitizer, a heterocyclic nitrogen base having but one nitrogen atom in the heterocyclic ring, the nitrogen atom being doubly bound to a carbon atom of the heterocyclic ring, the heterocyclic ring containing a fused-on carbocyclic ring, the heterocyclic base being selected from those containing in addition to nitrogen a hetero atom other than nitrogen in the heterocyclic ring and no substituents other than the fused-on carbocyclic ring and no substituents on the carbocyclic ring, those containing in addition to nitrogen a hetero atom other than nitrogen in the heterocyclic ring and containing a substituent but no substituent other than a substituent selected from the group consisting of alkyl groups, hydroxyalkyl groups, alkoxy groups, aryl groups, aryloxy groups, alkyl-, mercapto groups, arylmercapto groups, acyloxy groups and halogen atoms, and those containing no hetero atom other than the nitrogen in the heterocyclic ring and containing a substituent but no substituent other than a substituent selected from the group consisting of alkyl groups, hydroxyalkyl groups, alkoxy groups, aryl groups, aryloxy groups, alkylmercapto groups, arylmercapto groups and halogen atoms.

6. A photographic gelatino-silver-halide developing-out emulsion selected from the group consisting of gelatino-silver-chlorobromide, gelatino-silver-bromide and gelatino-silver-bromiodide developing-out emulsions spectrally sensitized with a cyanine dye which produces a maximum of spectral sensitivity in the emulsion at one concentration and at a higher concentration or upon digestion of the emulsion containing the dye at the lower concentration, produces a second maximum of spectral sensitivity at a wavelength longer than that of the first maximum, said emulsion containing, as a supersensitizer, a heterocyclic nitrogen base having but one nitrogen atom in the heterocyclic ring, the nitrogen atom being doubly bound to a carbon atom of the heterocyclic ring, the heterocyclic ring containing a fused-on carbocyclic ring, the heterocyclic base being selected from those containing no hetero atom other than the nitrogen in the heterocyclic ring and containing a substituent but no substituent other than a substituent selected from the group consisting of alkyl groups, hydroxyalkyl groups, alkoxy groups, aryl groups, aryloxy groups, alkylmercapto groups, arylmercapto groups and halogen atoms.

7. A photographic gelatino-silver-halide developing-out emulsion selected from the group consisting of gelatino-silver-chlorobromide, gelatino-silver-bromide and gelatino-silver-bromiodide developing-out emulsions spectrally sensitized with a cyanine dye which produces a maximum of spectral sensitivity in the emulsion at one concentration and at a higher concentration, or upon digestion of the emulsion containing the dye at the lower concentration, produces a second maximum of spectral sensitivity at a wavelength longer than that of the first maximum, said emulsion containing, as a supersensitizer, a heterocyclic nitrogen base having but one nitrogen atom in the heterocyclic ring, the nitrogen atom being doubly bound to a carbon atom of the heterocyclic ring, the heterocyclic ring containing a fused-on carbocyclic ring, the heterocyclic base being selected from those containing in addition to nitrogen a hetero atom other than nitrogen in the heterocyclic ring and no substituents other than the fused-on carbocyclic ring and no substituents on the carbocyclic ring.

8. A photographic gelatino-silver-halide developing-out emulsion selected from the group consisting of gelatino-silver-chlorobromide, gelatino-silver-bromide and gelatino-silver-bromiodide developing-out emulsions spectrally sensitized with a cyanine dye which produces a maximum of spectral sensitivity in the emulsion at one concentration and at a higher concentration, or upon digestion of the emulsion containing the dye at the lower concentration, produces a second maximum of spectral sensitivity at a wavelength longer than that of the first maximum, said emulsion containing as a supersensitizer, a quinoline base, the nitrogen atom of which is doubly bound to a carbon atom of the quinoline nucleus, and is not linked by a conjugated chain of atoms to another nitrogen atom, the quinoline base containing an alkyl group attached to one of the carbon atoms in the quinoline nucleus and no other substituents.

9. A photographic gelatino-silver-halide developing-out emulsion selected from the group consisting of gelatino-silver-chlorobromide, gelatino-silver-bromide and gelatino-silver-bromiodide developing-out emulsions spectrally sensitized with a cyanine dye which produces a maximum of spectral sensitivity in the emulsion at one concentration and at a higher concentration, or upon digestion of the emulsion containing the dye at the lower concentration, produces a second maximum of spectral sensitivity at a wavelength longer than that of the first maximum, said emulsion containing as a supersensitizer, a quinoline base, the nitrogen atom of which is doubly bound to a carbon atom of the quinoline nucleus, and is not linked by a conjugated chain of atoms to another nitrogen atom, the quinoline base containing a methyl group attached to one of the carbon atoms in the quinoline nucleus and no other substituents.

10. A photographic gelatino-silver-halide developing-out emulsion selected from the group consisting of gelatino-silver-chlorobromide, gelatino-silver-bromide and gelatino-silver-bromiodide developing-out emulsions spectrally sensitized with a cyanine dye which produces a maximum of spectral sensitivity in the emulsion at one concentration and at a higher concentration, or upon digestion of the emulsion containing the dye at the lower concentration produces a second maximum of spectral sensitivity at a wavelength longer than that of the first maximum, said emulsion containing as a supersensitizer, a benzothiazole base, the nitrogen atom of which is doubly bound to a carbon atom in the thiazole ring and is not linked by a conjugated chain of atoms to another nitrogen atom, the benzothiazole base being selected from those containing no substituents and those containing a substituent but no substituent other than a substituent selected from the group consisting of alkyl groups, hydroxyalkyl groups, alkoxy groups, aryl groups, aryloxy groups, alkylmercapto groups, arylmercapto groups and halogen atoms.

11. A photographic gelatino-silver-halide developing-out emulsion selected from the group consisting of gelatino-silver-chlorobromide, gelatino-silver-bromide and gelatino-silver-bromiodide developing-out emulsions spectrally sensitized with a cyanine dye which produces a maximum of spectral sensitivity in the emulsion at one concentration and at a higher concentration, or upon digestion of the emulsion containing the dye at the lower concentration produces a second maximum of spectral sensitivity at a wavelength longer than that of the first maximum, said emulsion containing, as a supersensitizer, benzothiazole.

12. A photographic gelatino-silver-halide developing-out emulsion selected from the group consisting of gelatino-silver-chlorobromide, gelatino-silver-bromide and gelatino-silver-bromiodide developing-out emulsions spectrally sensitized with a cyanine dye which produces a maximum of spectral sensitivity in the emulsion at one concentration and at a higher concentration, or upon digestion of the emulsion containing the dye at the lower concentration produces a second maximum of spectral sensitivity at a wavelength longer than that of the first maximum, said emulsion containing, as a supersensitizer, an alkoxy quinoline.

13. A photographic gelatino-silver-bromiodide developing-out emulsion spectrally sensitized with a cyanine dye which produces a maximum of spectral sensitivity in the emulsion at one concentration and at a higher concentration, or upon digestion of the emulsion containing the dye at the lower concentration, producing a second maximum of spectral sensitivity at a wavelength longer than that of the first maximum, said emulsion containing, as a supersensitizer, a heterocyclic nitrogen base having but one nitrogen atom in the heterocyclic ring, the nitrogen atom being doubly bound to a carbon atom of the heterocyclic ring, the heterocyclic ring containing a fused-on carbocyclic ring, the heterocyclic base being selected from those containing in addition to nitrogen a hetero atom other than nitrogen in the heterocyclic ring and no substituents other than the fused-on carbocyclic ring and no substituents on the carbocyclic ring, those containing in addition to nitrogen a hetero atom other than nitrogen in the heterocyclic ring and containing a substituent but no substituent other than a substituent selected from the group consisting of alkyl groups, hydroxyalkyl groups, alkoxy groups, aryl groups, aryloxy groups, alkylmercapto groups, arylmercapto groups, acyloxy groups and halogen atoms, and those containing no hetero atom other than the nitrogen in the heterocyclic ring and containing a substituent but no substituent other than a substituent selected from the group consisting of alkyl groups, hydroxyalkyl groups, alkoxy groups, aryl groups, aryloxy groups, alkylmercapto groups, arylmercapto groups and halogen atoms.

14. A photographic gelatino-silver-bromiodide developing-out emulsion spectrally sensitized with a cyanine dye which produces a maximum of spectral sensitivity in the emulsion at one concentration and at a higher concentration, or upon digestion of the emulsion containing the dye at the lower concentration, produces a second maximum of spectral sensitivity at a wavelength longer than that of the first maximum, said emulsion containing as a supersensitizer, a quinoline base, the nitrogen atom of which is doubly bound to a carbon atom of the quinoline nucleus, and is not linked by a conjugated chain of atoms to another nitrogen atom, the quinoline base containing an alkyl group attached to one of the carbon atoms in the quinoline nucleus and no other substituents.

15. A photographic gelatino-silver-bromiodide developing-out emulsion spectrally sensitized with a cyanine dye which produces a maximum of spectral sensitivity in the emulsion at one concentration and at a higher concentration, or upon digestion of the emulsion containing the dye at the lower concentration, produces a second maximum of spectral sensitivity at a wavelength longer than that of the first maximum, said emulsion containing as a supersensitizer, a quinoline base, the nitrogen atom of which is doubly bound to a carbon atom of the quinoline nucleus, and is not linked by a conjugated chain of atoms to another nitrogen atom, the quinoline base containing a methyl group attached to one of the carbon atoms in the quinoline nucleus and no other substituents.

16. A photographic gelatino-silver-bromiodide developing-out emulsion spectrally sensitized with a cyanine dye which produces a maximum of spectral sensitivity in the emulsion at one concentration and at a higher concentration, or upon digestion of the emulsion containing the dye at the lower concentration produces a second maximum of spectral sensitivity at a wavelength longer than that of the first maximum, said emulsion containing as a supersensitizer, a benzothiazole base, the nitrogen atom of which is doubly bound to a carbon atom in the thiazole ring and is not linked by a conjugated chain of atoms to another nitrogen atom, the benzothiazole base being selected from those containing no substituents and those containing a substituent but no substituent other than a substituent selected from the group consisting of alkyl groups, hydroxyalkyl groups, alkoxy groups, aryl groups, aryloxy groups, alkylmercapto groups, arylmercapto groups and halogen atoms.

17. A photographic gelatino-silver-bromiodide developing-out emulsion spectrally sensitized with a cyanine dye which produces a maximum of spectral sensitivity in the emulsion at one concentration and at a higher concentration, or upon digestion of the emulsion containing the dye at the lower concentration produces a second maximum of spectral sensitivity at a wavelength longer that that of the first maximum, said emulsion containing, as a supersensitizer, benzothiazole.

18. A photographic gelatino-silver-bromiodide developing-out emulsion spectrally sensitized with a cyanine dye which produces a maximum of spectral sensitivity in the emulsion at one concentration and at a higher concentration, or upon digestion of the emulsion containing the dye at the lower concentration produces a second maximum of spectral sensitivity at a wavelength longer than that of the first maximum, said emulsion containing, as a supersensitizer, a quinoline base, the quinoline base containing an alkoxyl group attached to one of the carbon atoms in the quinoline nucleus and no other substituents, said alkoxyl group containing from one to two carbon atoms.

19. A photographic gelatino-silver-bromiodide developing-out emulsion spectrally sensitized with a cyanine dye which produces a maximum of spectral sensitivity in the emulsion at one concentration and at a higher concentration, or upon digestion of the emulsion containing the dye at the lower concentration produces a second maximum of spectral sensitivity at a wavelength longer than that of the first maximum, said emulsion containing, as a supersensitizer, 6-methoxyquinoline.

BURT H. CARROLL.
JOHN SPENCE.

Certificate of Correction

Patent No. 2,398,778. April 23, 1946.

BURT H. CARROLL ET AL.

It is hereby certified that errors appear in the printed specification of the above numbered patent requiring correction as follows: Page 4, first column, lines 2–3, claim 4, for "supersensitier" read *supersensitizer*; line 11, for "used-on" read *fused-on*; line 16, for "substitute" read *substituent*; and that the said Letters Patent should be read with these corrections therein that the same may conform to the record of the case in the Patent Office.

Signed and sealed this 2d day of July, A. D. 1946.

[SEAL]

LESLIE FRAZER,
*First Assistant Commissioner of Patents.* concentration and at a higher concentration, or upon digestion of the emulsion containing the dye at the lower concentration produces a second maximum of spectral sensitivity at a wavelength longer that that of the first maximum, said emulsion containing, as a supersensitizer, benzothiazole.

18. A photographic gelatino-silver-bromiodide developing-out emulsion spectrally sensitized with a cyanine dye which produces a maximum of spectral sensitivity in the emulsion t one concentration and at a higher concentration, or upon digestion of the emulsion containing the dye at the lower concentration produces a second maximum of spectral sensitivity at a wavelength longer than that of the first maximum, said emulsion containing, as a supersensitizer, a quinoline base, the quinoline base containing an alkoxyl group attached to one of the carbon atoms in the quinoline nucleus and no other substituents, said alkoxyl group containing from one to two carbon atoms.

19. A photographic gelatino-silver-bromiodide developing-out emulsion spectrally sensitized with a cyanine dye which produces a maximum of spectral sensitivity in the emulsion at one concentration and at a higher concentration, or upon digestion of the emulsion containing the dye at the lower concentration produces a second maximum of spectral sensitivity at a wavelength longer than that of the first maximum, said emulsion containing, as a supersensitizer, 6-methoxyquinoline.

BURT H. CARROLL.
JOHN SPENCE.

Certificate of Correction

Patent No. 2,398,778.    April 23, 1946.

BURT H. CARROLL ET AL.

It is hereby certified that errors appear in the printed specification of the above numbered patent requiring correction as follows: Page 4, first column, lines 2–3, claim 4, for "supersensitier" read *supersensitizer*; line 11, for "used-on" read *fused-on*; line 16, for "substitute" read *substituent*; and that the said Letters Patent should be read with these corrections therein that the same may conform to the record of the case in the Patent Office.

Signed and sealed this 2d day of July, A. D. 1946.

[SEAL]

LESLIE FRAZER,
*First Assistant Commissioner of Patents.*